(12) United States Patent
Crocker (10) Patent No.: US 7,798,158 B2
(45) Date of Patent: Sep. 21, 2010

(54) MOBILE MARK REMOVAL SYSTEM

(76) Inventor: James P. Crocker, 1305 SE. Salerno Rd., Stuart, FL (US) 34997

( * ) Notice: Subject to any disclaimer, the term of this patent is extended or adjusted under 35 U.S.C. 154(b) by 994 days.

(21) Appl. No.: 11/340,104

(22) Filed: Jan. 26, 2006

(65) Prior Publication Data

US 2007/0169797 A1 Jul. 26, 2007

(51) Int. Cl.
*B08B 3/12* (2006.01)
(52) U.S. Cl. .............. 134/172; 180/53.4; 180/53.7; 180/305; 180/306; 134/56 R; 134/115 R; 134/184; 134/195; 134/201
(58) Field of Classification Search ............ 180/53.1, 180/53.4, 53.5, 53.7, 305, 306; 134/56 R, 134/115 R, 172, 173, 184, 186, 195, 201
See application file for complete search history.

(56) References Cited

U.S. PATENT DOCUMENTS

| | | | |
|---|---|---|---|
| 3,619,632 A | 11/1971 | Labombarde | |
| 3,658,589 A | 4/1972 | Shaddock | |
| 3,694,033 A | 9/1972 | Rowley et al. | |
| 3,812,379 A | 5/1974 | Kaufman et al. | |
| 3,900,969 A | 8/1975 | Diehn | |
| 3,977,128 A | 8/1976 | Goff | |
| 4,158,248 A * | 6/1979 | Palmer | 15/321 |
| 4,199,837 A | 4/1980 | Fisco, Jr. | |
| 4,227,893 A | 10/1980 | Shaddock | |
| 4,336,671 A | 6/1982 | Nelson | |
| 4,376,358 A | 3/1983 | Shelton | |
| 4,377,924 A | 3/1983 | Bergh | |
| 4,509,963 A | 4/1985 | Jackson | |
| 4,578,840 A | 4/1986 | Pausch | |
| 4,753,052 A | 6/1988 | Dickson | |
| 4,935,984 A | 6/1990 | Bryant et al. | |
| 5,002,595 A | 3/1991 | Kehr | |
| 5,060,334 A * | 10/1991 | Strauser et al. | 15/84 |
| 5,108,471 A | 4/1992 | Poborsky | |
| 5,236,278 A | 8/1993 | Dickson | |
| 5,826,460 A | 10/1998 | Soncina et al. | |
| 6,073,720 A * | 6/2000 | Vanderlinden | 180/307 |
| 6,082,630 A * | 7/2000 | Bohrer | 239/127 |
| 6,393,944 B1* | 5/2002 | Soncina et al. | 74/665 GA |
| 6,653,265 B2* | 11/2003 | Rossi et al. | 510/206 |
| 2006/0000491 A1* | 1/2006 | Crocker | 134/10 |

* cited by examiner

*Primary Examiner*—Michael Barr
*Assistant Examiner*—Jason Heckert
(74) *Attorney, Agent, or Firm*—McHale & Slavin, P.A.

(57) ABSTRACT

Disclosed is a cleaning system for removing coatings from a hard surface by high pressure liquid. The system employs a combination liquid and vacuum reservoir connected to a high pressure pump for directing ultra high pressure water through a blast head mounted on a front portion of the vehicle. The cleaning system is preferably mounted on a single truck with a single prime mover. The drive-line of the vehicle is constructed and arranged to operate in two distinct modes, e.g. a transport mode and a work mode. In the transport mode, a first transmission coupled to the rear portion of the prime mover delivers torque from the engine to the rear wheels of the vehicle. In the work mode, the prime mover is utilized to mechanically drive the bed mounted equipment as well as provide motive force in the form of mechanical-hydrostatic transmission to propel the system at a speed suitable for marking removal.

19 Claims, 5 Drawing Sheets

MOBILE MARK REMOVAL SYSTEM

RELATED APPLICATIONS

This application is related to U.S. patent application Ser. No. 10/884,643, filed Jul. 2, 2004 and entitled "Stripe Removal System", now U.S. Pat. No. 7,255,116; U.S. patent application Ser. No. 11/340,738, filed Jan. 26, 2009; U.S. patent application Ser. No. 11/368,020, filed Mar. 3, 2006; U.S. patent application Ser. No. 11/368,035, filed Mar. 3, 2006; U.S. patent application Ser. No. 11/835,642, filed Aug. 8, 2007; U.S. patent application Ser. No. 12/394,806, filed Feb. 27, 2008 and U.S. patent application Ser. No. 12/395,302, filed Feb. 27, 2009, the contents of which are incorporated herein in their entirety.

FIELD OF THE INVENTION

This invention relates to the field of high pressure water cleaning devices for highways, runways, parking decks, and other hard surfaces.

PRIOR ART BACKGROUND

The use of paint stripes on road surfaces is the accepted method to indicate vehicle lanes, crossing lanes, parking areas and numerous other indicators. Various pavement marking techniques are well known in the art, including the use of traffic paint, thermoplastics, epoxy paints and preformed tapes. Most pavement marking systems are intended to be as durable and permanent as possible, and resistant to weathering and wear from traffic. Common road surfaces are asphalt and concrete. The removal of such striping is typically required when the road is to be resurfaced or if the indication is to be changed.

When polymers such as paint or plastic are used for roadway marking, the surface of the pavement is penetrated from ⅛-⅜ inch, so that mere surface removal of the marking material is not sufficient to remove the marking. Therefore, current pavement marking removal machines often employ various forms of cutting devices to remove the marking material, as well as a portion of the underlying layer of pavement material in order to effectively remove painted lines.

Commonly known methods for removal of such markings typically include the use of abrasive grinding wheels, material removing cutters, or blasting of abrasive particles against the material to be removed. However, the use of these devices often results in undesirable grooves in the pavement surface.

For example, one type of cutting machine is disclosed in U.S. Pat. No. 5,236,278 known as a "Road Pro" manufactured by Dickson Industries, Inc. This type of machine employs parallel passive shafts that extend between circular rotating end plates. Hardened steel star wheels are carried on the parallel passive shafts, and these star wheels strike and abrade the pavement surface. While this type of device is effective for removal of markings, it often creates excessive heat which may melt thermoplastic materials causing equipment to gum up.

Another approach to pavement marking removal is the use of diamond saw blades or cutters arranged to make a dado cut. Still other types of machines use grinders or shot blast as described in U.S. Pat. Nos. 4,753,052; 4,376,358; 3,900,969; 4,336,671; 3,977,128 and 4,377,924. Unfortunately, these devices must remove a portion of the pavement material to effectively remove the marking, thereby leaving unsightly and potentially dangerous grooves in the pavement.

It is also known in the art to utilize high-pressure water jets to remove markings from pavement. The instant inventor teaches a Stripe Removal System in U.S. application Ser. No. 10/884,643, the contents of which are incorporated herein in their entirety. In addition, NLB Corporation markets a high pressure water jet system for removing paint from pavement under the name "STARJET". BLASTERS Corporation markets a high pressure water device which is mounted on a truck similar to the STARJET device.

A common problem associated with these prior art devices relates to the requirement of multiple prime movers, e.g. internal combustion engines, for operation of the various systems necessary for effective stripe removal. For example, these devices utilize one engine for transport of the system, e.g. the truck engine. A second engine is required for operation of the high-pressure water pumps, which develop at least 25,000 PSI. In the devices equipped with a vacuum system, a third engine is required for operation of the vacuum pump. Internal combustion engines are generally heavy and therefore consume a substantial amount of the allowed overall weight of the vehicle. In addition, engines consume a large amount of the bed space available on the truck. System maintenance and fuel costs are also substantially increased with the requirement of multiple engines. Still yet, mounting multiple engines on a single vehicle frame causes problems with proper weight distribution among the truck's various axles. With the exception of the instant inventor's prior teachings, the prior art generally requires multiple vehicles or trailers to transport a suitable amount of equipment to complete a marking removal task.

Therefore, what is needed in the art is a stripe removal system that is capable of eliminating the weight and maintenance of auxiliary engines used for powering deck mounted equipment. The system should provide power suitable to transport the system to a desired job site at typical highway speeds. Once at the job site the single prime mover should be configured to disconnect from a portion of the vehicle driveline and connect to deck mounted equipment for supplying power thereto. In addition, the system should provide power to the drive axle of the vehicle in the form of a mechanical-hydrostatic drive suitable for propelling the system along a surface at speeds suitable for marking removal.

SUMMARY OF THE PRESENT INVENTION

Briefly, disclosed is a cleaning system for removing coatings from a hard surface by high pressure liquid. The system employs a combination liquid and vacuum reservoir connected to a high pressure pump for directing ultra high pressure water through a blast head mounted on a front portion of the vehicle. The cleaning system is preferably mounted on a single truck with a single prime mover. The drive-line of the vehicle is constructed and arranged to operate in two distinct modes, e.g. a transport mode and a work mode. In the transport mode, a first transmission coupled to the rear portion of the prime mover delivers torque from the engine to the rear wheels of the vehicle. In the work mode, the prime mover is utilized to mechanically drive the bed mounted equipment as well as provide motive force in the form of mechanical-hydrostatic transmission to propel the system at a speed suitable for marking removal. The second transmission is constructed and arranged to disconnect the first transmission from the rear drive gear, transferring the torque produced by the prime mover to the bed mounted equipment. Additionally in this configuration, the second transmission powers a variable volume hydraulic pump. Pressurized fluid produced by the hydraulic pump is used to provide power to a fixed or variable displacement hydraulic motor coupled through the second transmission to the rear axle drive gears. The hydrostatic drive is controlled by the operator from the cab of the truck to allow infinite speed control up to a predetermined limit for marking removal.

Therefore, it is an objective of this invention to provide a surface marking removal system constructed and arranged to operate with a single prime mover.

It is another objective of the instant invention to provide a surface marking removal system which operates in a first mode for transport of the system and a second mode for removal of surface markings, wherein power for both modes is supplied by a single prime mover.

It is a further objective of the instant invention to provide a surface marking removal system which includes a second transmission for selective control between the first and second modes, wherein the vehicle's prime mover supplies power for operation of bed mounted equipment from the vehicle's prime mover in the second mode.

It is a further objective of the instant invention to provide a surface marking removal system which operates a high pressure water jet, a vacuum recovery, and an infinitely variable speed hydrostatic drive from a single prime mover.

It is yet another objective of the instant invention to provide a surface marking removal system which permits higher than standard flow rates without the additional weight of a larger engine to power the high pressure water pump.

It is still another objective of the instant invention to provide a surface marking removal system which provides increased horsepower to a high pressure pump to permit high surface marking removal rates due to increased water flow capacity.

Still yet another objective of the instant invention is to provide a surface marking removal system in which the construction of the system permits the transport of additional water without increasing weight over prior art constructions for longer operation times at typical flow rates.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

DETAILED DESCRIPTION OF THE INVENTION

Figure 1:
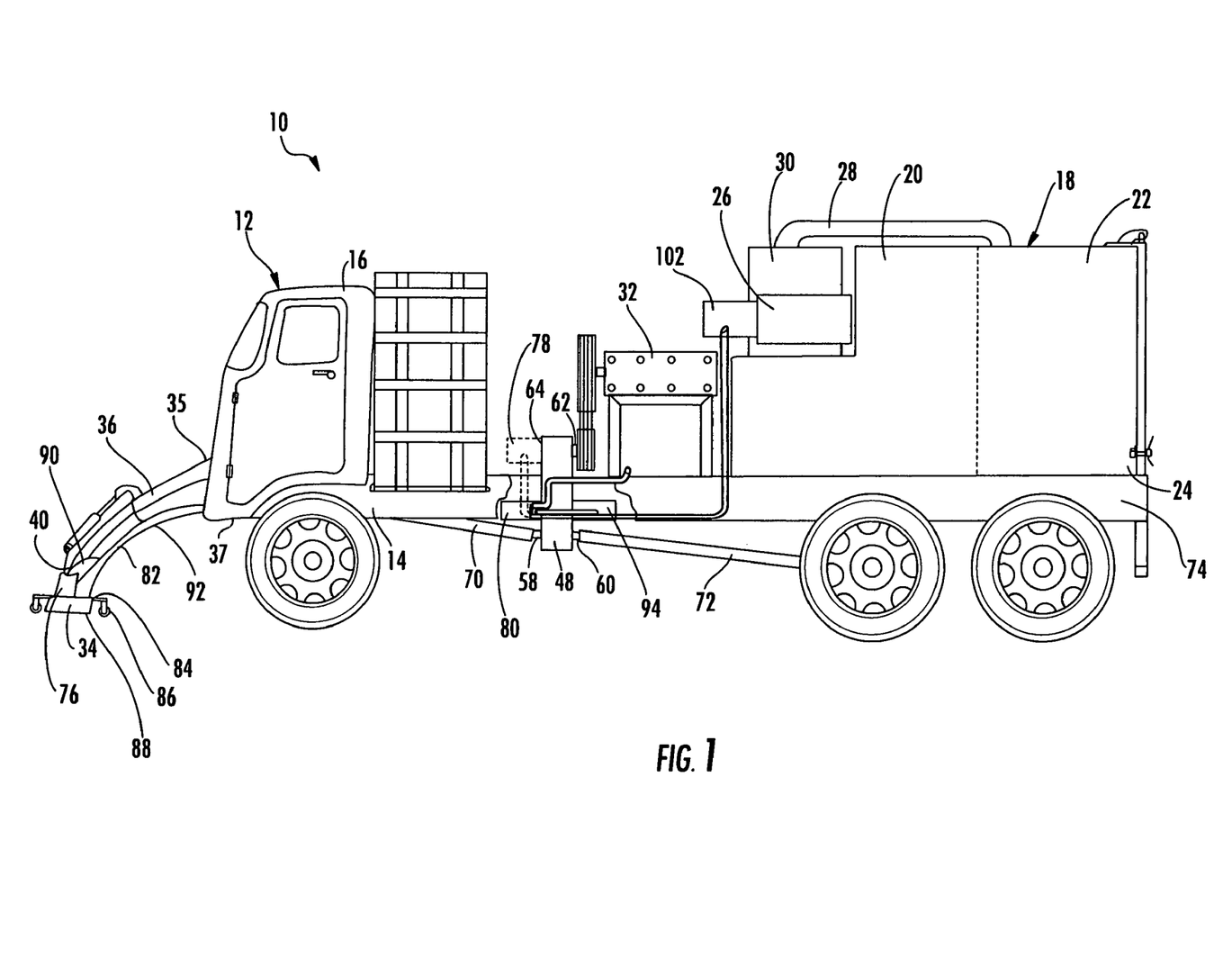
FIG. 1 is a side view, partially in section, of one embodiment of the instant invention illustrated with the rotary spray head in the operating position.
Figure 2:
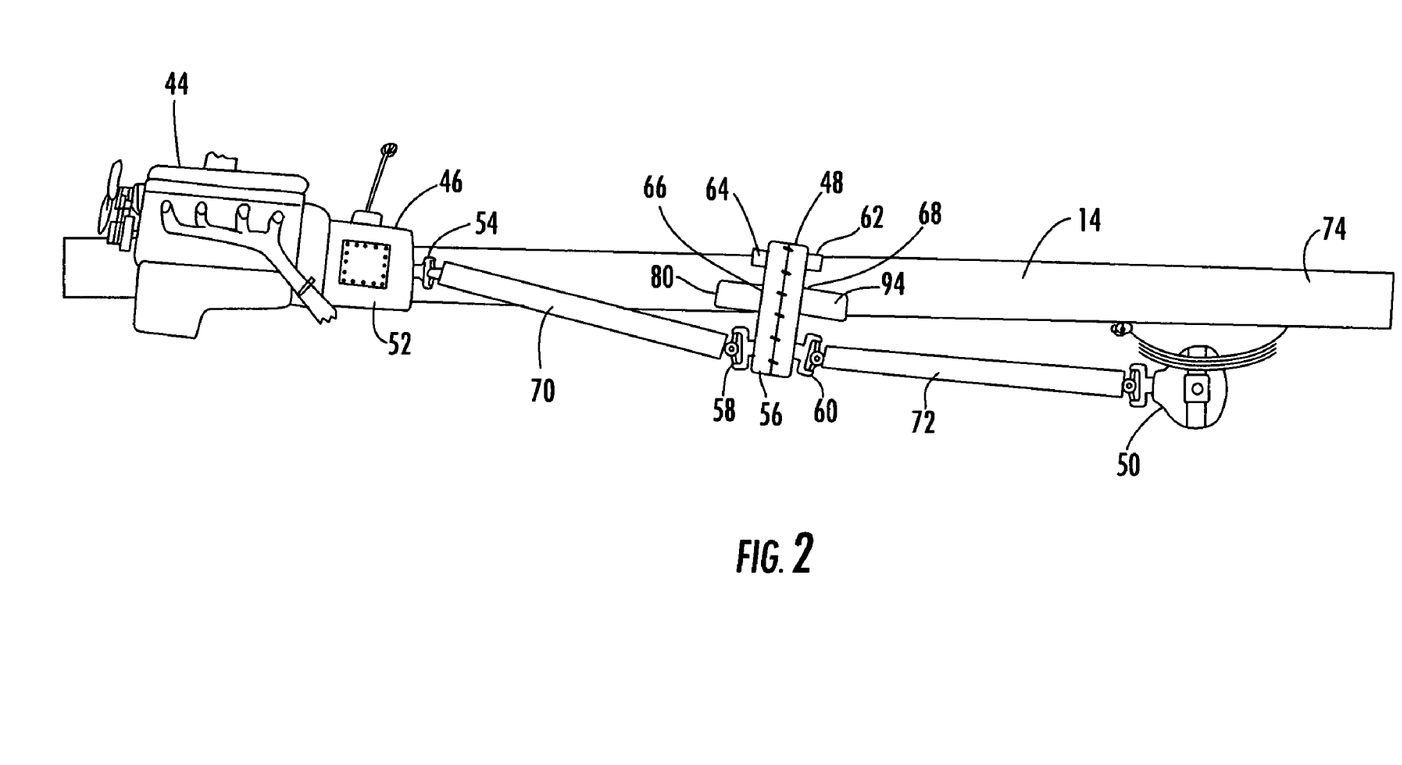
FIG. 2 is a partial side view illustrating the prime mover and the drive line of one embodiment of the instant invention.

The marking removal system 10, shown in FIG. 1, includes a prime-mover truck 12 having an elongated frame 14. Mounted on a front portion of the elongated frame 14 is a cab 16 for enclosing the operator as well as the driving and operating controls. Mounted on a front portion of the frame is a prime mover 44 (FIG. 2). The prime mover is generally an internal combustion engine of a type well known in the art, utilizing diesel, gasoline, propane, natural gas or other suitable fuel.

Referring to FIG. 2, the prime mover 44 is connected to the truck drive-line which includes a first transmission 46 and a second transmission 48 as well as the drive axle gears 50. The first transmission is operatively coupled to the prime mover as is well known in the art. The first transmission is preferably a manual type transmission with multiple forward and reverse gears such as is well known in the art. Alternatively, an automatic transmission having at least one forward and one reverse gear may be utilized without departing from the scope of the invention. The first transmission includes a case 52 and an output shaft 54.

The second transmission 48 is secured to the frame of the truck between the output shaft 54 of the first transmission 46 and the drive axle 50. The second transmission includes a case 56, a first input shaft 58, a first output shaft 60, a second output shaft 62, a third output shaft 64, a hydraulic pump output 66, and a hydraulic motor input 68. In the preferred embodiment, the first input shaft 58 and the first output shaft 60 are axially aligned to extend from both sides of the case 56. Also within the preferred embodiment, the second and third output shafts 62, 64 are axially aligned to extend from both sides of the case 56 and are spaced above the first input and output shafts as is illustrated in FIG. 2. Alternatively the second and third output shafts 62, 64 may be parallel with respect to one another and spaced in a horizontal plane to be above or below the first input and output shafts respectively. The hydraulic pump output 66 and hydraulic motor input 68 are preferably positioned along the outer surface of the case 56 between the axis of the second and third outputs and axis of the first input and output. However, it should be noted that other positions suitable for mounting the hydraulic pump and motor may be utilized without departing from the scope of the invention. Transmissions such as the second transmission described above are available from suppliers such as Omsi Transmission of Volciano Italy, and are disclosed in U.S. Pat. Nos. 5,826,460 and 6,393,944, the contents of which are incorporated herein by reference.

A first drive shaft 70 is connected to the output 54 of the first transmission 46 and the first input 58 of the second transmission 48. A second drive shaft 72 is coupled between the output shaft 60 of the second transmission 48 and the drive axle 50 of the truck.

Referring to FIGS. 1-4, mounted on a rear portion 74 of the frame 14 is a holding tank 18, including a water tank portion 20 and a vacuum recovery tank portion 22. In one embodiment the rear portion 24 of the holding tank is pivotally mounted on the truck frame 14 and hydraulically powered to tilt in the vertical plane to permit dumping of the contents of the vacuum recovery tank. The recovery tank 22 is operably connected to a vacuum pump 26 by a suitably sized conduit 28. The vacuum pump is preferably capable of drawing approximately 1100 CFM (cubic feet per minute) of air through the vacuum tank. Operably connected between the vacuum tank and the vacuum pump is a dust separator 30. The dust separator is constructed and arranged to prevent airborne particles drawn through the vacuum tank from being drawn through the vacuum pump and discharged into the atmosphere.

Also mounted on the frame is a high-pressure water pump 32. The high-pressure water pump is capable of supplying 2-15 GPM (gallons per minute) of water to at least one spray head 34 at 25,000-45,000 PSI (pounds per square inch). In a most preferred embodiment, the high-pressure water pump is constructed and arranged to deliver 6 GPM to each of two rotating spray heads at about 40,000 PSI. A high pressure hose or conduit is used to connect the water pump with the spray head(s).

An articulating arm 36 having a first end 35 is pivotally secured to a front portion 37 of the frame 14 and at least one spray head 34 is mounted to the distal end 40 thereof. The articulating arm is constructed and arranged to be infinitely positioned relative to the front portion of the truck via pneumatics, hydraulics, electric motors or suitable combinations thereof. The articulating arm is also movable in a vertical manner to provide a storage position and an operating position. A joystick or other suitable control device (not shown) is provided in the cab 16 of the truck to allow an operator to manipulate the articulating arm throughout an operator determinable path. A plurality of high pressure nozzles (not shown) are rotatably secured within the spray head along an elongated tubular member (not shown). Rotation of the elongated tubular member is controlled via a hydraulic motor 76. The hydraulic motor 76 is connected to a hydraulic pump 78 and/or 80 via a high pressure hose 82 and controlled from the cab of the truck. The spray head is carried on a chassis 84 supported on casters 86. A shroud 88 descends from the chassis and surrounds the high pressure nozzles. The spray head is connected to the high pressure fluid pump by high pressure hose 90, and the shroud 88 is connected to the vacuum tank by a vacuum hose 92.

Figure 3:
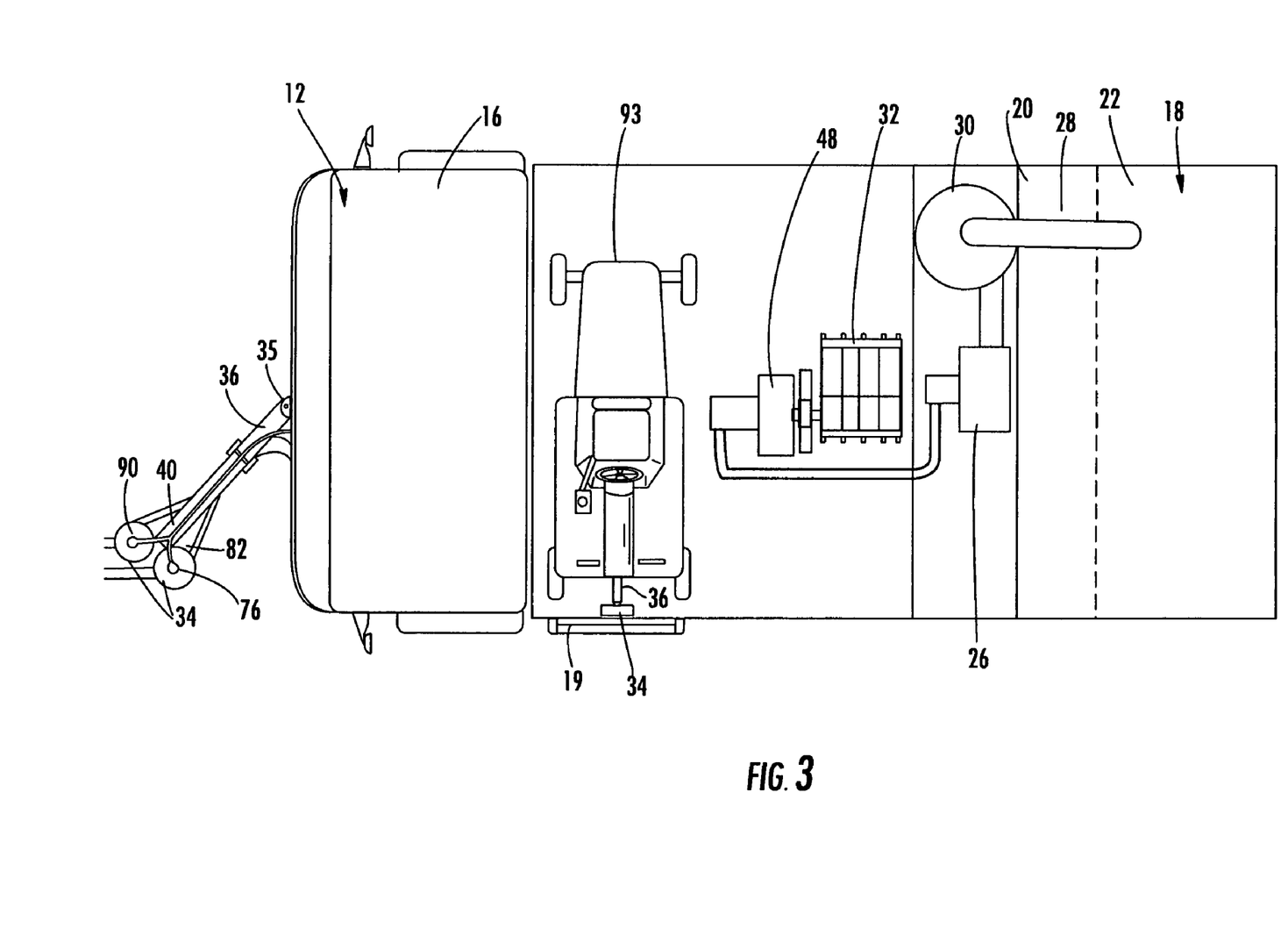
FIG. 3 is a top view of the embodiment shown in FIG. 1.

In one embodiment a ramp 19 is hinged to the edge of the frame 14 just behind the cab 16 of the truck. The ramp can be lowered to provide a pathway for a self propelled tractor 93 (FIG. 3). The tractor is equipped with an articulating arm 36 and a spray head 34 mounted on a front portion thereof. As shown in FIG. 1, the ramp 19 is illustrated in the stowed or traveling position for highway transport. When the ramp is unfolded it is approximately 9 feet in length to provide a pathway for loading the tractor. The tractor 93 is constructed and arranged to be stored and transported on the truck in a position transverse with respect to the longitudinal centerline of the truck. This orientation requires the tractor, the articulating arm, and the spray head to be less than 8 feet 6 inches in length. The high pressure hose (not shown) and the vacuum hose (not shown) for the tractor may be supported by a swinging boom (not shown) which is mounted on the frame 14 to provide freedom of movement for the tractor and to prevent tangling or running over of the hoses by the truck. A tractor configured for transport in a transverse position is shown and described in the instant inventors co-pending application Ser. No. 10/884,643, entitled "Stripe Removal System" as well as the application entitled "Transportable Holding Tank for Stripe Removal Systems" filed Jan. 6, 2006 the contents of which are incorporated herein in their entirety.

Figure 5:
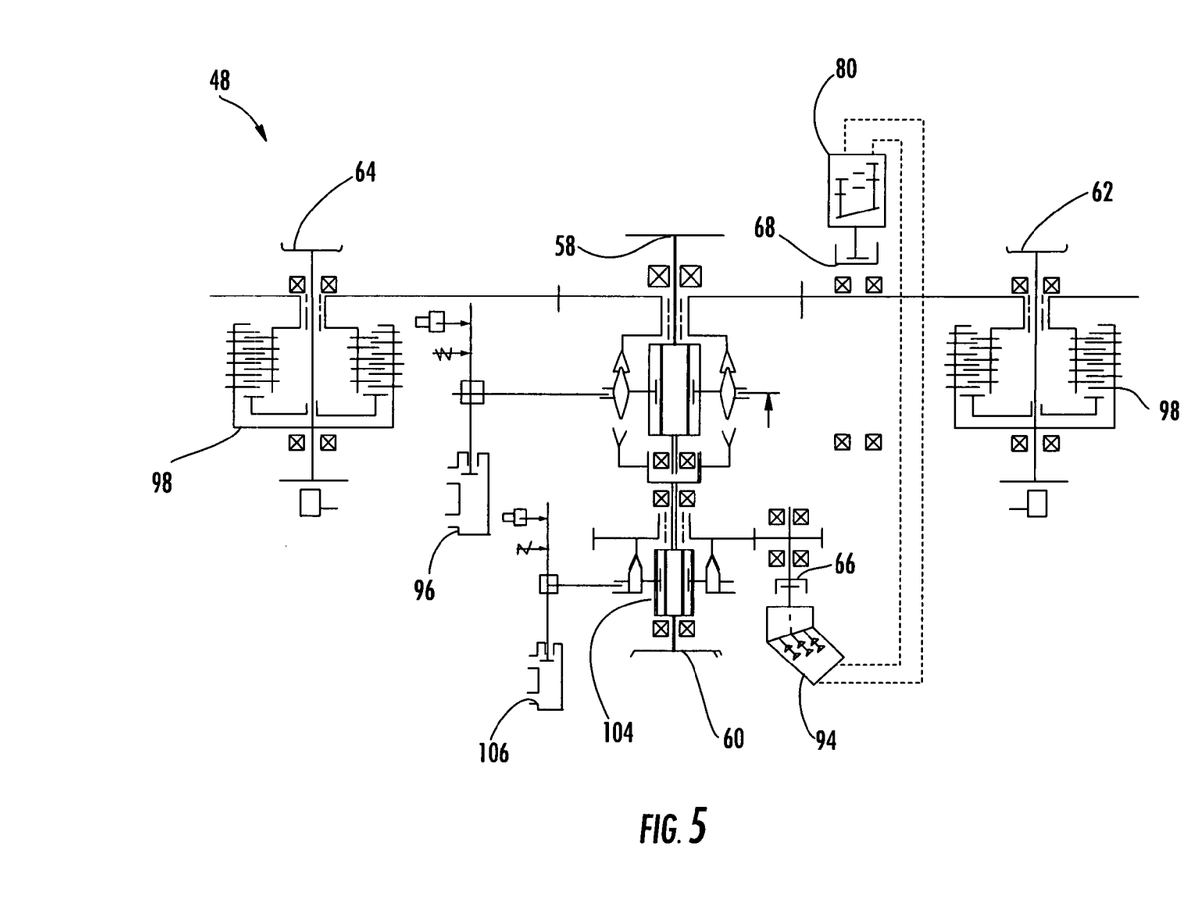
FIG. 5 is a schematic illustration of the second transmission utilized in the instant invention.

Referring to FIG. 5, a schematic representation of one embodiment of the second transmission 48 utilized in the instant invention is illustrated. The construction of the second transmission provides the marking removal truck with two modes of operation, a transport mode and a work mode. In the transport mode, the first input shaft 58 of the second transmission is operatively coupled to the output shaft 60. The engagement between the shafts may be accomplished with splined shafts and a ring having internal splines or other suitable means for coupling shafts. In the preferred embodiment a fluid powered cylinder 96 is utilized to slide a ring to engage the two shafts. Other means such as cables or levers may be utilized in place of the fluid cylinder without departing from the scope of the invention. This construction allows power from the prime mover 44 and the first transmission 46 to drive through the second transmission to the drive axle 50 of the truck for transport of the entire system in a conventional manner.

Figure 4:
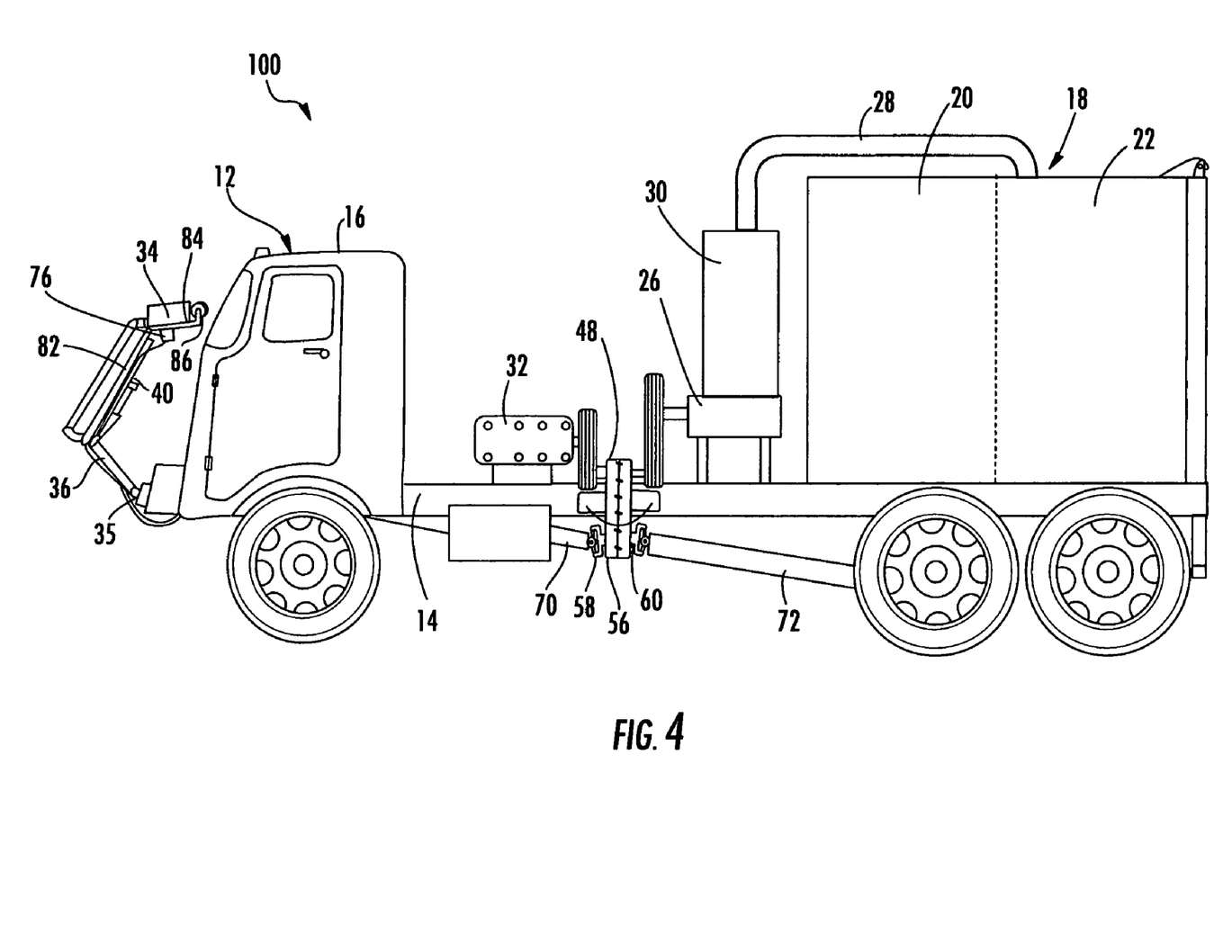
FIG. 4 is a side view of one embodiment of the instant invention illustrated with the rotary cleaning head in the transport position.

In the work mode, the input shaft 58 of the second transmission is uncoupled from the output shaft 60 via the fluid cylinder moving the engagement ring as described above. The second and/or third output shafts 62, 64 are coupled to the input shaft 58 via clutches 98 or other suitable means of engagement. Engagement of the second and/or third output shaft preferably engages the hydraulic pump output 66 to drive a first hydraulic pump 80, most preferably a variable volume pump. The second output shaft 62 is operably connected to the high pressure water pump 32 via belts and pulleys. Alternatively gears, chain drives or suitable combinations thereof may be utilized to connect the second output shaft to the high pressure water pump. In one embodiment, the third output shaft 64 is operably connected to a second hydraulic pump 78 (FIG. 1). The second hydraulic pump is fluidly connected to a second hydraulic motor 102 operably secured to the input shaft of the vacuum pump 26. In another embodiment, the third output shaft 64 is operably connected to the vacuum pump via belts and pulleys as illustrated in FIG. 4. Alternatively, gears, chain drives or suitable combinations thereof may be utilized to connect the third output shaft to the vacuum pump without departing from the scope of the invention. In this embodiment the second hydraulic pump and motor are eliminated.

In the work mode the first hydraulic pump 80 and motor 94 are utilized to form a mechanical-hydrostatic transmission, wherein fluid generated by the first pump is delivered to the first hydraulic motor. The hydraulic motor is coupled to the hydraulic motor output shaft of the second transmission by suitable means such as a slip ring with internal splines 104, gears, clutches, chains or suitable combinations thereof. In the preferred embodiment a fluid powered cylinder 106 is utilized to slide the slip ring to engage the output shaft to the hydraulic motor. Other means such as cables or levers may be utilized in place of the fluid cylinder without departing from the scope of the invention. A joystick type control (not shown) is provided within the cab of the truck to allow an operator to infinitely control the speed of the truck within a predetermined range. In a most preferred embodiment the mechanical-hydrostatic transmission is constructed and arranged to propel the system from 0 to 10 MPH (miles per hour).

The configuration described above is especially useful for marking removal. The prime mover may be set at an optimum RPM for efficiency or power. The bed mounted equipment is then powered from the prime mover, eliminating the need for additional prime movers for their operation. The weight of the additional prime movers is eliminated, allowing the truck to carry additional water for extended operation without the need to refill the water tank 20. The mechanical-hydrostatic transmission allows the speed of the truck to be controlled for optimum marking removal. For example, the truck speed may be increased between marks being removed, such as a dashed line, without changing the rotational speed of the prime mover. In addition, the increased horsepower provided by the prime mover allows for increased water pump size when compared to the prior art. The increased water pump size facilitates increased removal rates or the ability to operate two spray heads as illustrated herein. Both spray heads may be secured to the articulating arm, as illustrated in FIG. 3 for the removal of two lines simultaneously. Alternatively, the tractor spray head may be operated simultaneously with the spray head(s) on the front of the truck for removal of markings on opposite sides of a roadway. In addition to removing markings, the system is useful for tasks such as removal of accumulated rubber from airport runways, cleaning parking lots, factory floors and the like.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

What is claimed is:

1. A mobile marking removal system comprising:

a truck, said truck including an elongated frame, said elongated frame including a prime mover secured to a front portion thereof and a drive-line, the drive-line of said truck operable in a transport mode and a work mode, said drive-line including a drive axle secured to rear portion of said frame, a first transmission having an input operatively connected to said prime mover and an output operatively connected to a first input shaft of a second transmission, said second transmission secured to said elongated frame between said first transmission and said drive axle, said second transmission including a first output operatively connected to said drive axle, said second transmission including a second output operatively connected to a hydraulic pump, said hydraulic pump fluidly connected to a hydraulic motor, said hydraulic motor operatively connected to a second input, a third output operatively connected to a high pressure water pump, said high pressure water pump fluidly connected to a water tank, said high pressure water pump and said water tank secured to said truck frame, said transport mode of operation connecting said first transmission output, said first input and said first output of said second transmission allowing said prime mover to transport said truck via said first transmission, said second mode disconnecting said first input from said first output and connecting said first input to said second and said third outputs, whereby said prime mover may be maintained at a constant speed for operation of said hydraulic and said high pressure water pumps and wherein said first output is operatively connected to said second input allowing infinite speed control of said truck within a predetermined range via said hydraulic pump and motor combination.

2. The mobile marking removal system of claim 1 including a vacuum recovery tank mounted on said frame, said vacuum tank including an inlet for allowing a combination of air, water and debris to enter said tank, a first outlet for connection a vacuum pump;

a vacuum pump secured to said elongated frame, wherein said second transmission includes a third output shaft for selective operation of said vacuum pump, whereby upon disengagement of said first output from said first input said third output shaft may be selectively engaged to power said vacuum pump from said prime mover.

3. The mobile marking removal system of claim 1 wherein said third output shaft and said fourth output shaft are axially aligned to extend outwardly from opposite sides of a second transmission case and are spaced above said second input shaft and said second output shafts.

4. The mobile marking removal system of claim 1 wherein said mechanical-hydrostatic transmission includes a controller operable from a cab portion of said truck, said controller constructed and arranged to allow an operator to vary the transport speed of said mobile marking removal system by controlling the flow of fluid between said hydraulic pump and said hydraulic motor.

5. The mobile marking removal system of claim 1 wherein said water pump is operatively connected to said at least one second output shaft via belts and pulleys.

6. The mobile marking removal system of claim 1 wherein said water pump is operatively connected to said at least one second output shaft via chain and sprockets.

7. The mobile marking removal system of claim 1 wherein said water pump is operatively connected to said at least one second output shaft via a second hydraulic pump and a second hydraulic motor, wherein said second hydraulic pump is operatively connected to said second output shaft of said second transmission, wherein said second hydraulic motor is operatively connected to said water pump, wherein said second hydraulic motor is fluidly connected to said second hydraulic pump.

8. The mobile marking removal system of claim 1 wherein said vacuum pump is operatively connected to said at least one third output shaft via belts and pulleys.

9. The mobile marking removal system of claim 1 wherein said vacuum pump is operatively connected to said at least one third output shaft via chain and sprockets.

10. The mobile marking removal system of claim 1 wherein said vacuum pump is operatively connected to said at least one third output shaft via a second hydraulic pump and a second hydraulic motor, wherein said second hydraulic pump is operatively connected to said third output shaft of said second transmission, wherein said second hydraulic motor is operatively connected to said vacuum pump, wherein said second hydraulic motor is fluidly connected to said second hydraulic pump.

11. The mobile marking removal system of claim 1 including an articulating arm secured to said front portion of said of said elongated frame, wherein at least one spray head is secured to a distal end of said articulating arm, said spray head including a plurality of nozzles therein, said nozzles fluidly connected to said water pump.

12. The mobile marking removal system of claim 11 wherein said articulating arm includes two spray heads secured to the distal end thereof, each of said spray heads fluidly connected to said water pump.

13. The mobile marking removal system of claim 1 including an articulating arm secured to said front portion of said of said elongated frame, wherein at least one spray head is secured to a distal end of said articulating arm, said spray head including a plurality of nozzles therein, said nozzles fluidly connected to said water pump, wherein said nozzles are surrounded by a shroud, said shroud fluidly connected to said vacuum pump for recovery of water and debris cleaned from a surface beneath said shroud.

14. The mobile marking removal system of claim 1 including a ramp pivotally connected to said elongated frame, said ramp movable between a lowered position to provide a pathway for a self propelled tractor and a raised position for movement of said truck, wherein said self propelled tractor is constructed and arranged to be positioned on said frame in a transverse orientation with respect to said frame.

15. The mobile marking removal system of claim 1 wherein said water tank and said vacuum tank are formed within a single enclosure, said enclosure having a divider therein for dividing said enclosure into said water tank and said vacuum tank.

16. The mobile marking removal system of claim 15 wherein said tank enclosure is rectangular in shape.

17. The mobile marking removal system of claim 15 wherein said tank enclosure is constructed and arranged to tilt, whereby a front portion of said enclosure raises to a position higher than a rear portion of said enclosure.

18. The mobile marking removal system of claim 1 wherein said first transmission is a manually shifted transmission having more than one forward gear.

19. The mobile marking removal system of claim 1 wherein said first transmission is an automatically shifting transmission having more than one forward gear.

* * * * *

UNITED STATES PATENT AND TRADEMARK OFFICE
CERTIFICATE OF CORRECTION

PATENT NO. : 7,798,158 B2  Page 1 of 1
APPLICATION NO. : 11/340104
DATED : September 21, 2010
INVENTOR(S) : James P. Crocker It is certified that error appears in the above-identified patent and that said Letters Patent is hereby corrected as shown below:

In the Claims

Col. 7, Claim 1, Line 32, after "output" insert --shaft--.
Col. 7, Claim 1, Line 33, after "output" insert --shaft--.
Col. 7, Claim 1, Line 42, after "input" insert --shaft--.
Col. 7, Claim 1, Line 43, after "output" insert --shaft--.
Col. 7, Claim 1, Line 45, delete "second" and insert --work--.
Col. 7, Claim 1, Line 45, after "input" insert --shaft--.
Col. 7, Claim 1, Line 46, after "output" insert --shaft--.
Col. 7, Claim 1, Line 46, after "input" insert --shaft--.
Col. 7, Claim 1, Line 47, delete "outputs" and insert --output shafts--.
Col. 7, Claim 1, Line 50, delete "first" and insert --second--.

Signed and Sealed this
Sixteenth Day of December, 2014

Michelle K. Lee
*Deputy Director of the United States Patent and Trademark Office*